United States Patent [19]

Müller

[11] Patent Number: 5,213,057
[45] Date of Patent: May 25, 1993

[54] POSITION INDICATING APPARATUS
[75] Inventor: Fritz Müller, Ingelfingen, Fed. Rep. of Germany
[73] Assignee: Gebrüder Müller Apparatebau GmbH & Co. KG, Ingelfingen, Fed. Rep. of Germany
[21] Appl. No.: 801,004
[22] Filed: Dec. 2, 1991
[30] Foreign Application Priority Data
Dec. 20, 1990 [DE] Fed. Rep. of Germany ....... 9017208
[51] Int. Cl.⁵ .................. F16K 37/00; G01L 19/12
[52] U.S. Cl. ................................ 116/281; 116/277; 137/553
[58] Field of Search ............. 116/277, 281, 268; 200/308; 137/553

[56] References Cited
U.S. PATENT DOCUMENTS

| | | | |
|---|---|---|---|
| 3,451,423 | 6/1969 | Priesa | 251/63.5 X |
| 3,532,069 | 10/1970 | Morgan | 116/269 |
| 4,020,784 | 5/1977 | Greene | 116/268 |
| 4,448,148 | 5/1984 | Gain, Jr. | 116/277 |
| 4,450,861 | 5/1984 | Bouteille | 137/553 |
| 4,654,643 | 3/1987 | Meisenheimer, Jr. | 116/281 X |
| 4,736,671 | 4/1988 | Drorz | 137/55 L |

Primary Examiner—Daniel M. Yasich
Attorney, Agent, or Firm—Henry M. Feiereisen

[57] ABSTRACT

A position indicator apparatus for a valve of the type having a valve housing and a valve element, includes an actuator spindle fixedly secured to the valve element of the valve and an indicator spindle operatively connected to the actuator spindle. The indicator spindle is guided in a bush which is provided with an external thread for engagement to the valve housing of the valve. The upper end of the indicator spindle is provided with a complementary ribbed crown which protrudes a ribbed stationary guide member. A stroke of the valve element is transmitted to the actuator valve which in turn forces the indicator spindle upwards so that the ribbed crown moves past the perimeter of the guide member for displaying the respective position of the valve.

19 Claims, 5 Drawing Sheets

POSITION INDICATING APPARATUS

BACKGROUND OF THE INVENTION

The present invention refers to a position indicating apparatus, and in particular to a position indicating apparatus for use in a valve, especially for smaller strokes, and being of the type having a spindle-shaped actuator which is fixedly secured to a valve element (valve disk, valve piston, etc.), with the position indicating apparatus being securely mounted to the housing of the valve.

SUMMARY OF THE INVENTION

It is an object of the present invention to provide an improved position indicating apparatus which allows a superior visible display of the position of the valve from outside.

It is further object of the present invention to provide an improved position indicating apparatus which is especially suitable for valves with small strokes.

These objects and others which will become apparent hereinafter are attained in accordance with the present invention by a position indicating apparatus which includes an actuator spindle fixedly secured to the valve element of the valve, and an indicator spindle operatively connected to the actuator spindle and extending through the housing of the valve toward the outside for allowing display of the respective position of the valve.

Suitably, the actuator spindle and the indicator spindle are coupled in such a manner as to be movable relative to each other in axial direction, with the maximum stroke of the indicator spindle being limited by a stop, and with the actuator spindle being axially movable relative to the indicator spindle when the actuator spindle carries out a stroke exceeding the maximum stroke of the indicator spindle.

Preferably, the indicator spindle is tubular, with the actuator spindle projecting into the indicator spindle.

According to another feature of the present invention, a compression spring extends axially between the actuator spindle and the indicator spindle, with the actuator spindle acting upon the indicator spindle via the compression spring. In the event, the stroke of the actuator spindle exceeds the maximum stroke of the indicator spindle, the latter further penetrates the hollow actuator spindle, with the spring being increasingly compressed. In order to return the indicator spindle into its initial position upon closed valve, a further compression spring is arranged between the indicator spindle and a bush which is threadably engaged in the valve housing and ensures an axial guidance of the indicator spindle.

Suitably, the indicator spindle is provided with at least one axial oblong hole which is engaged e.g. by at least one pin of the actuator spindle for limiting the maximum axial penetration of the actuator spindle relative to the indicator spindle.

According to yet another feature of the present invention, the indicator spindle is provided with a head piece which is axially movable relative to a stationary guide member. The head piece is provided with circular segment shaped ribs which engage complementary circular segment shaped slots of the guide member so that the position of the ribs relative to the guide member provides an indication of the position of the valve. The ribs of the head piece and the slots of the guide member are arranged about several concentric circles of different radii.

Suitably, the head piece and the guide member are of dome-shaped outer configuration so that the axial length or height of the ribs of the head piece and the slots of the guide member ar radially graduated and increase from outside toward the center.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
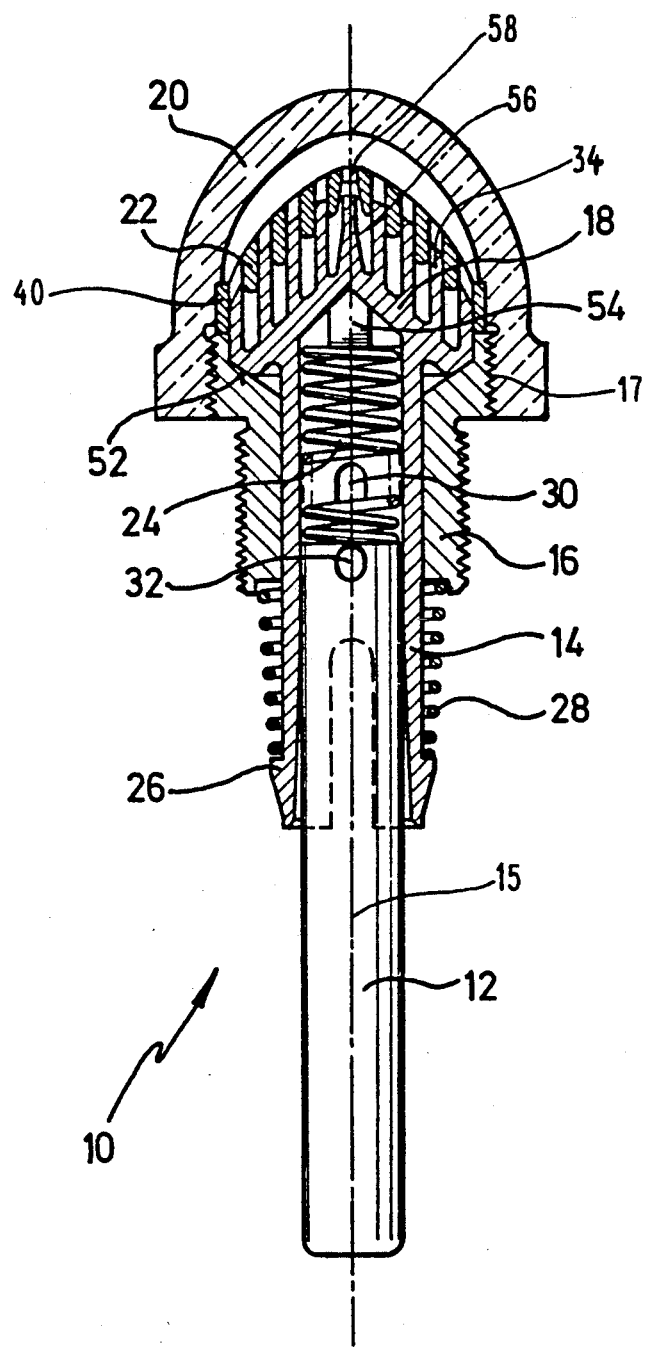
FIG. 1 is a longitudinal section of one embodiment of a position indicating apparatus according to the present invention, illustrating in detail a spindle-shaped indicator and a spindle-shaped actuator.

Throughout all the FIGS., the same or corresponding elements are always indicated by the same reference numerals.

Referring now to the drawing and in particular to FIG. 1, there is shown a longitudinal section of one embodiment of a position indicating apparatus according to the present invention, generally designated by reference numeral 10. The position indicating apparatus includes a spindle-shaped actuator 12 which has one end securely fixed to a valve element, such as a valve disk or valve piston, as will be described further below in connection with FIG. 7.

The actuator spindle 12 projects into a tubular spindle-shaped indicator 14 which is guided in axial direction by a threaded bush 16. The bush 16 is of T-shaped configuration and includes an external thread 17 meshing with an internal thread of a dome 20 by which the top of the position indicating apparatus 10 is closed and which is made of suitable transparent material. At the actuator spindle distant end, the indicator spindle 14 is provided with an integral crown or head piece 18 which is of arched configuration like a cap or rounded cone or in the shape of a hemisphere and includes a plurality of axial ribs 34 in the shape of circular segments, as shown in particular in FIG. 3. The ribs 34 are spaced along several circles of different radii, with the circles extending concentrically about the center axis 15 of the position indicating apparatus 10. In the nonlimiting example of FIG. 3, the ribs 34 are spaced about four concentric circles, with a same radial distance being selected between the ribs 34. However, it will be appreciated that the radial distance between the ribs 34 may certainly vary.

Figure 2:
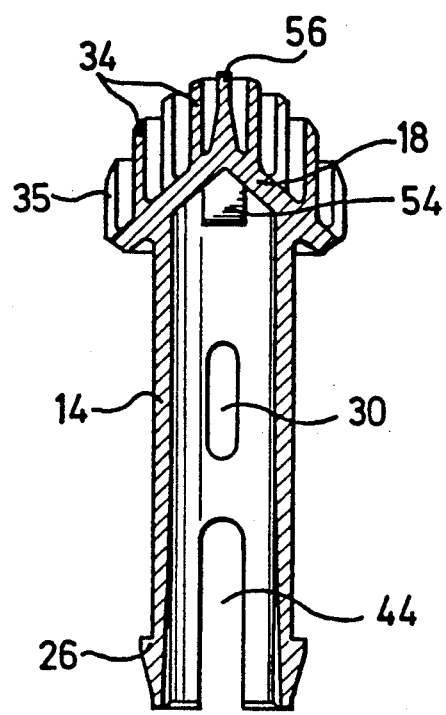
FIG. 2 is a longitudinal section of the position indicating apparatus of FIG. 1, showing in detail the indicator spindle.

As shown in particular in FIG. 2, the axial elongation of the ribs 34 increases toward the center 15 in which a pin 56 is disposed so that the envelope of the ribs 34 is configured in the shape of a cone or a rounded cone, with the radially outermost ribs 35 having the least axial elongation and the pin 56 having the greatest axial elongation.

Figure 3:
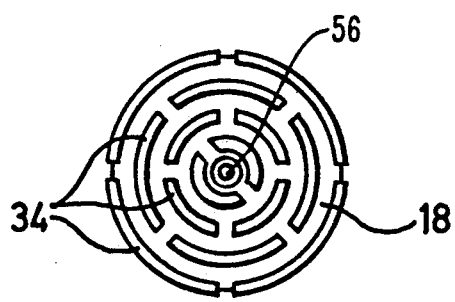
FIG. 3 is a top view of the indicator spindle, showing the head portion thereof.
Figure 4:
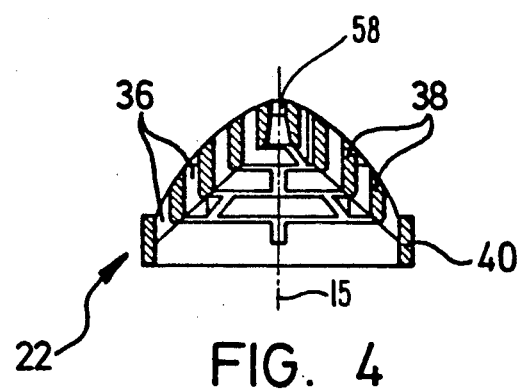
FIG. 4 is a longitudinal section of the position indicating apparatus, showing in detail a stationary guide member which cooperates with the indicator spindle.
Figure 5:
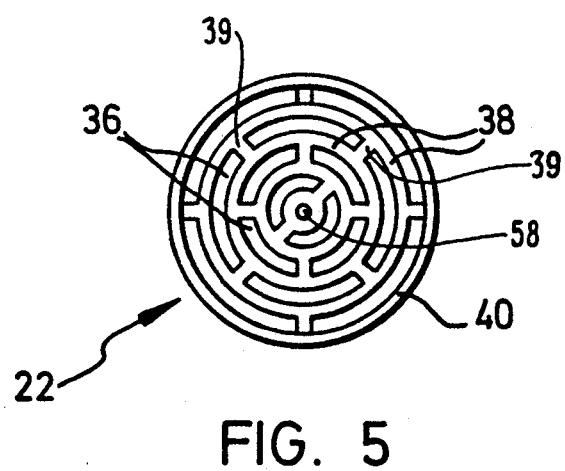
FIG. 5 is a top view of the guide member.

Fixedly secured between the bush 16 and the dome 20 is a stationary guide member 22 which cooperates with the head piece 18 and includes an annular flange 40 by which the guide member 22 is fixedly secured between the bush 16 and the dome 20 (FIG. 1) so as to be stationary relative to the head piece 18. A comparison of FIGS. 3 and 5 shows that the outer configuration of the guide member 22 corresponds essentially to the outer configuration of the head piece 18. As shown in FIGS. 4 and 5, the guide member 22 is provided with a plurality of rings 38 which extend concentrically about the symmetrical or center axis 15 and are radially connected with each other by spaced bridges 39 so as to define a plurality of slots 36 in the shape of circular segments and in a number and configuration complementary to the number and configuration of the ribs 34 of the head piece 18. Thus, as shown in FIG. 1, the ribs 34 project into the respective slots 36 of the guide member 22. In its center, the guide member 22 is provided with an axial bore 58 which is engaged by the central pin 56 of the head piece 18.

As outlined above, the outer configuration of the guide member 22 corresponds essentially to the outer configuration of the head piece 18, so that the rings 38 and the slots 36 gradually increase in axial direction toward the center as shown in FIG. 4. Thus, like the head piece 18, the guide member 22 has also the shape of a cap or rounded cone.

In the illustration of FIG. 1, the valve is closed and the head piece 18 bears upon a shoulder 52 of the threaded bush 16. The maximum stroke of the indicator spindle 14 is limited by the impact of the head piece 18 upon the guide member 22, with the maximum stroke amounting e.g. to 5 mm.

At the underside facing the actuator spindle 12, the head piece 18 is provided with a short abutment 54 which slightly projects downwardly into the indicator spindle 14. Arranged in the space between the upper end of the actuator spindle 12 and the abutment 54 is a compression spring 24, with its upper end bearing against the abutment 54 and its lower end resting on the actuator spindle 12.

In vicinity of its lower end, the indicator spindle 14 is provided with an annular shoulder 26 which supports one end of a compression spring 28 which acts as a return spring for the indicator spindle 14. The other end of the compression spring 28 bears against the lower end face of the threaded bush 16. In the nonlimiting example of FIG. 1, the compression spring 28 is shown in the configuration of a conical spring, however, it will be appreciated that the compression spring 28 may also be of cylindrical configuration.

Figure 6:
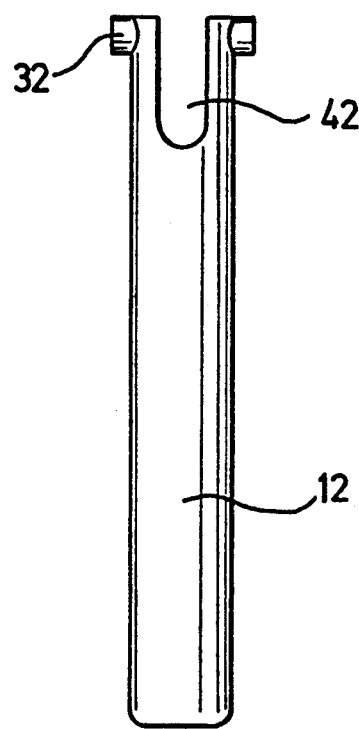
FIG. 6 is a schematic view of the actuator spindle.

Turning now again to FIG. 2, it can be seen that the tubular indicator spindle 14 is provided with two diametrically opposed axial oblong holes 30, each of which being engaged by a pin 32 of the actuator spindle 12, with the pins 32 being provided in one piece with the actuator spindle 12, as shown in FIG. 6. The indicator spindle 14 is suitably provided with a slot 42 which extends in axial direction from the upper end surface of the indicator spindle 14 so as to give the pins 32 sufficient elasticity. In this manner, the actuator spindle 12 can easily be inserted into the indicator spindle 14 and the pins 32 can into the oblong holes 30.

As shown in FIG. 2, the indicator spindle 14 is also provided with a slot 44. For facilitating the attachment of the actuator spindle 12, the indicator spindle 14 may be provided with a flared lower end.

Figure 7:
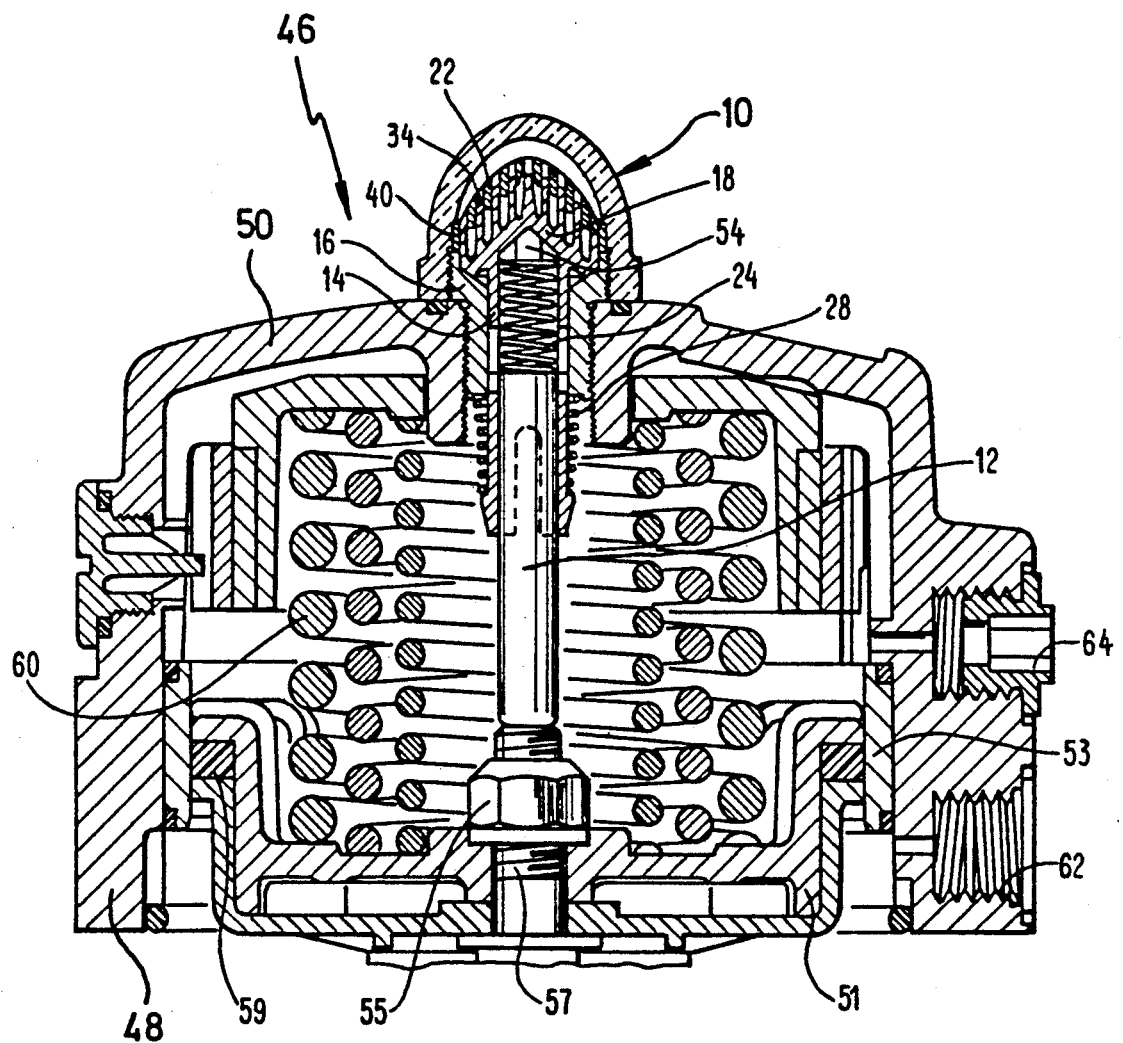
FIG. 7 is a sectional view of the position indicating apparatus of FIG. 1 in cooperation with an exemplified valve.

Turning now to FIG. 7, there is shown an exemplified, fragmentary sectional view of the position indicating apparatus 10 for use in connection with an exemplary valve 46 of the type having a housing 48 and a valve bonnet 50 placed upon the housing 48. Accommodated in the housing 48 is a valve element in form of a piston 51 which reciprocates in axial direction between two end positions and is guided in a piston bushing 53. Centrally mounted to the piston 51 via a nut 55 is the threaded end of a piston rod 57 which extends beyond the axial end (not shown) of the housing 48 for allowing attachment of a suitable device such as a diaphragm of a diaphragm valve which is actuated by the piston 51 for opening and closing the diaphragm valve which is actuated by the piston 51. The piston 51 is suitably sealed by a gasket 59. Acting upon the top side of the piston 51 are a plurality of compression springs 60 which urge the piston 51 in downward direction i.e. in closing direction of the valve. At a suitable lateral location, the housing 48 is provided with an inlet port 62 and an outlet port 64 for circulation of a pressure fluid. The pressure fluid is supplied to the inlet port 62 and introduced into the housing 48 at an area below the piston 51 to thereby allow the piston 51 to be axially shifted upwardly against the force exerted by the compression springs 60 and to open the valve which is linked to the piston rod 57.

The position indicating apparatus 10 is fixedly secured in the bonnet 50 by threadably engaging the external thread of the bush 16 with a complementary internal thread of the bonnet 50. Although not shown in detail, the lower end of the actuator spindle 12 is secured to the valve element such as the piston rod 57. Persons skilled in the art will understand that the valve as shown in FIG. 7 is made by way of example only in order to facilitate understanding of the mode of operation of the position indicating apparatus.

The position indicating apparatus operates as follows:

When opening the valve 46 through inflow of pressure fluid through inlet port 62, the piston 51 with its piston rod 57 moves upwards and thus forces the actuator spindle 12 upwards as well. The upward motion of the actuator spindle 12 is transmitted via the compression spring 24 and the abutment 54 upon the indicator spindle 14, with compression spring 28 being compressed and tensioned. In contrast to the compression spring 24 which is characterized by a hard springiness, the compression spring 28 is characterized by a soft springiness. That means that the compliance of the compression spring 24 is selected such as to transmit the upward motion of the actuator spindle 12 onto the indicator spindle 14 without any significant compression while the soft spring 28 is tensioned.

Thus, the indicator spindle 14 moves upwards so that the head piece 18 is displaced relative to the stationary guide member 22, with ribs 34 and pin 56 of the head piece 18 traversing the respective slots 36 and bore 58 of the guide member 22 and emerging from the upper perimeter of the guide member 22. The extent or degree of projection of the ribs 34 beyond the upper end face of the guide member 22 is an indication of the stroke of the indicator spindle 12 and thus of the valve element.

Through the arched configuration of the head piece 18 and of the guide member 22, the ribs 34 of the head piece 18 emerge simultaneously from the slots 36 of the guide members 22, however, at graduated levels so as to attain a clearly visible display. If necessary, the display may be reinforced by designing the head piece 18 and the guide member 22 with different colors. Since the ribs 34 of the head piece 18 when exiting the guide member 22 are easily recognizable, even small strokes of the valve can be detected and reliably estimated.

The stroke of the head piece 18 is given, e.g. 5 mm and is limited by the impact of the head piece 18 upon the guide member 22. Until reaching the maximum stroke of the indicator spindle 14 the compression spring 24 is insignificantly compressed. However, when the head piece 18 strikes against the stationary guide member 22 and thus prevents the indicator spindle 14 from a further upward movement, a continuous upward movement of the actuator spindle 12 relative to the indicator spindle 14 causes a compression of spring 24. Since the indicator spindle 14 remains stationary, the compression spring 28 is not further compressed. The upward movement of the actuator spindle 12 and thus the compression of spring 24 is limited by the pins 32 within the oblong holes 30, i.e. when the pins 32 reach the upper end of the oblong holes 30, a further upward movement of the actuator spindle 12 is prevented so as to avoid an excessive compression of the spring 24 to a point in which winding will bear upon winding.

When the valve 46 closes, the actuator spindle 12 moves downwards. As long as spring 24 is under tension, the indicator spindle 14 and thus the head piece 18 remain in their upper end position, with spring 24 urging the head piece 18 against the guide member 22. Upon further downward movement of the actuator spindle 12, the spring 24 relaxes. As soon as the spring 24 is completely relaxed and with continuous downward movement of the actuator spindle 12, the return spring 28 forces the indicator spindle 14 in downward direction and back into the initial position as shown in FIG. 1, with the head piece 18 bearing against the shoulder 52 of the bush 16.

Persons skilled in the art will understand that even though FIG. 1 shows the ribs 34 to be at a significant distance from the upper perimeter of the guide member 22 in the lower end position of the head piece 18, the dimension of the head piece 18 and the guide member 22 is such that in the lower end position of the head piece 18 this distance is only slight and insignificant. For ease of illustration, the distance between the axial ends of the ribs 34 and the perimeter of the guide member 22 has, however, been exaggerated in FIG. 1.

The non-rigid coupling of the actuator spindle 12 and the indicator spindle 14 allows the position indicating apparatus 10 to be used for valves with an opening stroke exceeding the maximum stroke of the actuator spindle 14. Therefore, the position indicating apparatus 10 can be used for a wide range of valves.

Those skilled in the art will understand that changes can be made in the preferred embodiment here described, and that these embodiments can be used for other purposes.

According to a modification of the embodiment as shown in the drawing, the actuator spindle 12 and the indicator spindle 14 may be coupled via a frictional engagement. In this case, the provision of spring 24, spring 28, oblong holes 30, pins 32 and abutment 54 can be omitted. The operation of such a position indicating apparatus is as follows:

During the upward movement of the actuator spindle 12, the frictional engagement between the outer surface of the actuator spindle 12 and the inside surface of the indicator spindle 14 causes the latter to follow the movement of the actuator spindle 12. The ribs 34 of the head piece 18 emerge from the guide member 22 in a same manner as described with the embodiment of FIG. 1. Also the maximum stroke of the actuator spindle 14 is limited by the impact of the head piece 18 upon the guide member 22. A functional difference compared to the first embodiment resides in the fact that if the stroke of the indicator spindle 12 exceeds the maximum stroke of the indicator spindle 14, the actuator spindle 12 further penetrates the indicator spindle 14 which retains its position since the head piece 18 bears upon the guide member 22. During closing of the valve and downward movement of the actuator spindle 12, the frictional fit with the actuator spindle 12 forces the indicator spindle 14 to follow the downward movement of the actuator spindle 12 until the head piece 18 bears upon the shoulder 52 of the bush 16.

The latter embodiment is thus also suitable for positional indication of valves with an opening stroke exceeding the maximum stroke of the indicator spindle 14.

While the invention has been illustrated and described as embodied in a position indicating apparatus, it is not intended to be limited to the details shown since various modifications and structural changes may be made without departing in any way from the spirit of the present invention.

What is claimed and desired to be protected by Letters Patent is set forth in the appended claims:

1. Apparatus adapted for securement to the housing of a valve for indicating the position of a movable valve element of the valve, comprising:
   an actuator spindle fixedly secured to the valve element;
   an indicator spindle operatively connected to said actuator spindle and provided with a head piece; and
   guide means connectable to the housing of the valve in opposite relationship to said head piece for cooperation therewith such that a movement of said valve element is transmitted via said actuator spindle to said indicator spindle to thereby displace said head piece relative to said guide means, with the degree of projection of said head piece beyond said guide means being commensurate with the position of the valve element.

2. The apparatus defined in claim 1 wherein said actuator spindle and said indicator spindle are, coupled in such a manner as to be movable relative to each other in axial direction.

3. The apparatus defined in claim 2, and further comprising a stop, said indicator spindle being defined by a given maximum stroke which is limited by said stop, with said actuator spindle being axially movable relative to said indicator spindle when said actuator spindle carries out a stroke exceeding the maximum stroke of said indicator spindle.

4. The apparatus defined in claim 2 wherein said actuator spindle is coupled with said indicator spindle via a frictional engagement.

5. The apparatus defined in claim 4 wherein said actuator spindle has an outer surface and the indicator spindle has an inner surface, said frictional engagement being attained through frictional fit between the outer surface of said actuator spindle and the inner surface of said indicator spindle.

6. The apparatus defined in claim 1 wherein said indicator spindle is tubular, with said actuator spindle projecting into said indicator spindle.

7. The apparatus defined in claim 1, and further comprising spring means extending in axial direction between said actuator spindle and said indicator spindle, said actuator spindle acting upon said indicator spindle via said spring means.

8. The apparatus defined in claim 7 wherein said spring means includes a compression spring.

9. The apparatus defined in claim 1, and further comprising a threaded bush for guiding said indicator spindle in axial direction, said threaded bush being threadably engaged in the valve housing.

10. The apparatus defined in claim 9, and further comprising spring means arranged between said indicator spindle and said threaded bush for returning said indicator spindle to its initial position.

11. The apparatus defined in claim 10 wherein said spring means includes a compression spring.

12. The apparatus defined in claim 1 wherein said indicator spindle is provided with at least one axial oblong hole, said actuator spindle including at least one pin engaging said oblong hole for limiting a maximum axial penetration of said actuator spindle relative to said indicator spindle.

13. The apparatus defined in claim 1, and wherein said guide means includes a stationary guide member, said head piece of said indicator spindle being axially movable relative to said guide member.

14. The apparatus defined in claim 13 wherein said head piece is provided with ribs traversing complementary slots of said guide member so that the position of said ribs relative to said guide member provides an indication of the position of the valve.

15. The apparatus defined in claim 14 wherein said ribs and said complementary slots are of circular segment like configuration.

16. The apparatus defined in claim 14 wherein said ribs of said head piece and the slots of said guide member are arranged along several concentric circles of different radii.

17. The apparatus defined in claim 13 wherein the head piece and said guide member are of dome-shaped outer configuration.

18. The apparatus defined in claim 13, and further comprising a cover of transparent material for shielding said head piece and said guide member toward the outside.

19. The apparatus defined in claim 18, and further comprising a threaded bush threadably engaged in the valve housing and provided for guiding said indicator spindle in axial direction, said cover being threadably engaged with said bush, with said guide member being securely fixed between said cover and said bush.

* * * * *